United States Patent
Chen et al.

(10) Patent No.: US 9,326,306 B2
(45) Date of Patent: Apr. 26, 2016

(54) INTERACTIVE REMOTE WINDOWS BETWEEN APPLICATIONS OPERATING WITHIN HETEROGENEOUS OPERATING SYSTEMS ON MOBILE AND STATIONARY DEVICES

(71) Applicant: Acer Incorporated, New Taipei (TW)

(72) Inventors: Li-Wei Chen, New Taipei (TW); Hung-Chih Yu, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 14/492,224

(22) Filed: Sep. 22, 2014

(65) Prior Publication Data
US 2015/0189498 A1    Jul. 2, 2015

(30) Foreign Application Priority Data
Jan. 2, 2014  (TW) .............................. 103100113 A (51) Int. Cl.
*H04W 76/02* (2009.01)
*H04W 4/00* (2009.01)

(52) U.S. Cl.
CPC ............ *H04W 76/023* (2013.01); *H04W 4/008* (2013.01)

(58) Field of Classification Search
CPC .......... H04M 1/72533; H04M 1/7253; H04M 2250/02; H04W 88/02; H04W 76/023; H04W 4/008; G08C 17/02
See application file for complete search history.

(56) References Cited

U.S. PATENT DOCUMENTS

| 8,745,191 | B2 * | 6/2014 | Raleigh | G06Q 30/016 455/414.1 |
| 2011/0030020 | A1 * | 2/2011 | Halttunen | H04M 1/7253 725/98 |
| 2013/0072263 | A1 | 3/2013 | Kim | |
| 2013/0176415 | A1 * | 7/2013 | Kim | H04N 5/23219 348/78 |

FOREIGN PATENT DOCUMENTS

TW    201324239 A1    6/2013
TW    I397854 B1      6/2013

OTHER PUBLICATIONS

Taiwan Office Action, Oct. 16, 2015, 8 pages.

* cited by examiner

*Primary Examiner* — Ted Wang
(74) *Attorney, Agent, or Firm* — Edell, Shapiro & Finnan, LLC (57) ABSTRACT

A method of operating, from a stationary device, an application that is running on a mobile device is disclosed. The method includes causing the stationary device to open a window that will display content of an application running on the mobile device, sending the content from the application running on the mobile device to the stationary device, receiving operation commands for the application running on the mobile device from the stationary device, the operation commands being operable to cause actions to be executed by the application running on the mobile device, and sending new content from the application running on the mobile device to the stationary device, the new content resulting from the operation commands having been executed by the application running on the mobile device. The mobile device has a first operating system and the stationary device has a second operating system different from the first operating system.

14 Claims, 5 Drawing Sheets

FIG.9

INTERACTIVE REMOTE WINDOWS BETWEEN APPLICATIONS OPERATING WITHIN HETEROGENEOUS OPERATING SYSTEMS ON MOBILE AND STATIONARY DEVICES

RELATED APPLICATION DATA

This application claims priority under 35 U.S.C. §119 to Taiwan patent application TW 103100113, filed on Jan. 2, 2014, the disclosure of which is incorporated herein by reference in its entirety.

TECHNICAL FIELD

Background

Mobile devices (e.g., smartphones) are ubiquitous in everyday life. Indeed, in many cases, mobile devices have come to replace stationary devices (e.g., laptop or desktop computers) for daily work and entertainment. While many activities including web page browsing, instant messaging, document editing, photo/video viewing, among others, can be performed by light-weight and portable mobile devices, users of such devices are nevertheless desirous of larger screen sizes that provide an improved user interface experience. Of course, a larger screen size on a mobile device leads to a larger overall size of the mobile device which detrimentally impacts the portability of the device. Larger physical keyboards associated with stationary devices likewise offer a more comfortable text input interface, but the size and convenience of smaller portable devices are still more desirable.

Furthermore, when a user switches from a mobile state (i.e., using a mobile device) to a static state (i.e., using a stationary device) for work, education or entertainment, the user cannot easily transfer their work product, files, etc. from the mobile device (smartphone) to the stationary device (e.g., laptop or desktop). Often times, even when a potentially more desirable user interface of a stationary device is available, a user may nevertheless need to continue to use his mobile device with smaller screen size and less convenient text input interface.

Consider an example of a user browsing a web page on a smartphone where the user would, e.g., like to copy and paste the website link (presently available on the smartphone) into the browser of a laptop/desktop computer to continue browsing on the larger, stationary, device. Similarly, consider a user editing a document, photo or video on a smartphone. When the user has the opportunity to transition to using a laptop/desktop computer, the user must copy the relevant working file(s) from the smartphone to the laptop/desktop computer via, e.g., a remote storage services mechanism, to continue the on-going work on the stationary device.

The movement or switch of operations from one device to another is referred to herein as a "transition." Transition between mobile and stationary devices in current technologies can be classified into two categories: Non-Interactive and Interactive.

In accordance with the Non-Interactive approach, the screen of a mobile device is mirrored to the screen of a stationary device or an external display via, e.g., Wi-Fi Display or Miracast, a peer-to-peer wireless screencasting standard formed via Wi-Fi Direct connections in a manner similar to Bluetooth. That is, Miracast enables wireless delivery of audio and video to or from desktops, tablets, mobile phones, and other devices by echoing display from a phone or tablet onto a TV or computer display. Consequently, users gain the advantage of a larger screen, but unfortunately still cannot operate directly on the stationary device. In other words, the Non-Interactive approach may be considered to operate as an "extended window," but with only uni-directional operation.

In accordance with the Interactive approach, mobile devices are connected to stationary devices via a connection cable. The screen of the stationary device is used as the extension window of the mobile device and the input interfaces (e.g., keyboard, mouse) can likewise be recognized/utilized by the mobile device. For example, the PadPhone™ series available from Asus is based on this approach. Significantly, however, paired devices operating in accordance with the Interactive approach need to have the same operating system, as the approach effectively extends the input/output operations of the smartphone to the input/output components of the stationary device. Thus, the Interactive approach has very limited utility since most users are more likely to want to combine a laptop/desktop computer operating with, e.g., a Microsoft Windows™/Apple Mac™ operating system with a smartphone/tablet operating with a Google Android™/Apple iOS™ operating system.

SUMMARY

A method of operating, from a stationary device, an application that is running on a mobile device is disclosed. The method includes causing the stationary device to open a window that will display content of an application running on the mobile device, sending the content from the application running on the mobile device to the stationary device, receiving operation commands for the application running on the mobile device from the stationary device, the operation commands being operable to cause actions to be executed by the application running on the mobile device, and sending new content from the application running on the mobile device to the stationary device, the new content resulting from the operation commands having been executed by the application running on the mobile device. The mobile device has a first operating system and the stationary device has a second operating system different from the first operating system.

A mobile device and a stationary device configured to carry out the aforementioned functionality are also described.

BRIEF DESCRIPTION OF THE DRAWINGS

Embodiments are described herein in conjunction with the accompanying drawings, in which.

DESCRIPTION OF EXAMPLE EMBODIMENTS

Embodiments of the present invention are directed to providing interactive remote windows between applications within heterogeneous operating systems operating on, respectively, a mobile device and a stationary device. In accordance with the embodiments described herein, a user can pair a mobile device and a stationary device via wireless paring (e.g. Bluetooth) and thereafter exchange commands and data between the devices via, e.g., Wi-Fi Direct or a wireless LAN/WAN. In a particular implementation, a user selects or appoints an application running on a mobile device to a sub-window on the stationary device. Thereafter, the operations being performed by the application on the mobile device are displayed in the sub-window on the stationary device. Significantly, user input operations (e.g., tap, text input, scroll) within the sub-window on the stationary device are displayed virtually simultaneously in the corresponding application window on the mobile device. In the event the mobile device can no longer communicate with the stationary device because, e.g., the mobile device is carried away from the stationary device and Bluetooth coverage is lost, the sub-window on the stationary device is closed automatically. In accordance with the embodiments described herein, since the application on the mobile device is always "synced up" with the sub-window on the stationary device (and, in fact, all application computation is performed by the mobile device from beginning to end), a user can seamlessly transition to the mobile device to continue working with the application without additional effort or steps.

Thus, as will become apparent to those skilled in the art in view of the description below, embodiments of the present invention provide several benefits.

(1) Ease of operation. Users can easily associate, connect or bind a mobile device and a stationary device to exchange commands and data without using a physical cable.

(2) Comfort of operations. Users can operate the application running on the mobile device with the stationary device, which has a larger screen size and more convenient input interface.

(3) Convenience of file exchange. As a result of the sub-window on the stationary device that corresponds to an extended window of the application running on the mobile device, users can intuitively copy files between the mobile and stationary devices using a conventional drag and drop operation. Indirect transmission of files via a remote storage service is no longer needed.

(4) Portability of devices. When a user carries the mobile device away from the stationary device, thus breaking the wireless communication link between the mobile device and the stationary device, there is no need to wait for data synchronization or physical cable removal. In accordance with the embodiments described herein, the application on the mobile device is always "synced up" with the sub-window on the stationary device since all application computation is performed by the mobile device from beginning to end. Accordingly, a user can seamlessly transition to the mobile device to continue working with the application without interruption.

Figure 1:
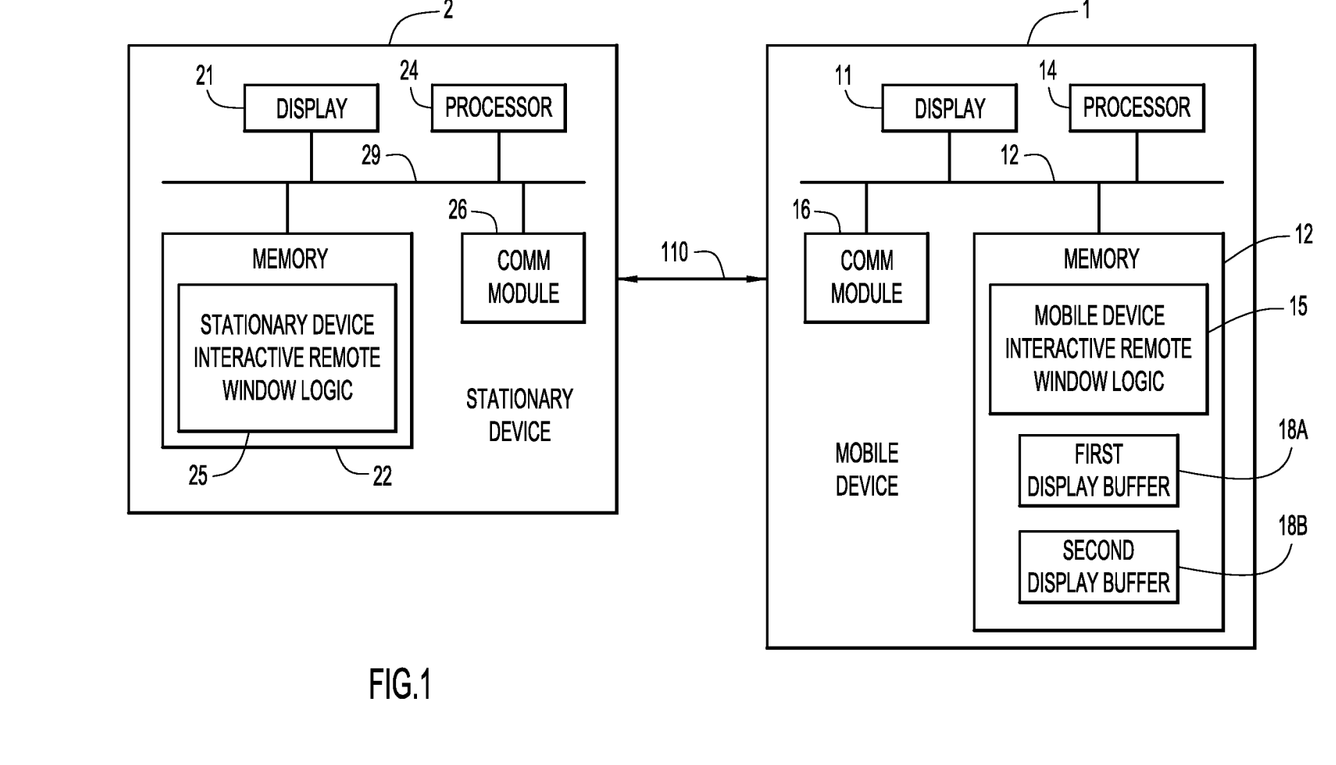
FIG. 1 is a block diagram of a mobile device and stationary device that can be operated interactively in accordance with an embodiment of the present invention.

FIG. 1 is a block diagram of a mobile device and stationary device that can be operated interactively in accordance with an embodiment of the present invention. More specifically, a mobile device 1, such as a smartphone, tablet computer, etc., includes a display 11, memory 12, which may include mobile device interactive remote window logic 15, a processor 14, and a communications module 16. Memory 12 may include a first display buffer 18A and a second display buffer 18B. The foregoing components or modules may be communicatively coupled with one another via a bus 19.

A stationary device 2, such as a desktop computer, laptop computer, etc., includes a display 21, memory 22, which may include stationary device interactive remote window logic 25, a processor 24, and a communications module 26. The foregoing components or modules may be communicatively coupled with one another via a bus 29.

Processors 14 and 24 may be microprocessors or microcontrollers that are configured to execute program logic instructions (i.e., software) for carrying out various operations and tasks described herein. For example, processors 14 and 24 may be configured to execute mobile device or stationary device interactive remote window logic 15, 25 that is stored in memory 12 and 22, respectively.

Memory 12, 22 may comprise read only memory (ROM), random access memory (RAM), magnetic disk storage media devices, optical storage media devices, flash memory devices, electrical, optical or other physical/tangible memory storage devices.

The functions of processors 14, 24 may be implemented by logic encoded in one or more tangible (non-transitory) computer storage medium (e.g., embedded logic such as an application specific integrated circuit, digital signal processor instructions, software that is executed by processors 14, 24, etc.), wherein memory 12, 22 stores data used for the operations described herein and stores software or processor executable instructions that are executed to carry out the operations described herein.

Communication modules 16, 26 may be Bluetooth communications modules or any other short range wireless communications module or unit that can operate to support a communication link 110 between mobile device 1 and stationary device 2. That is, mobile device 1 and stationary device 2 may be communicatively coupled to one another via communication link 110.

Figure 2:
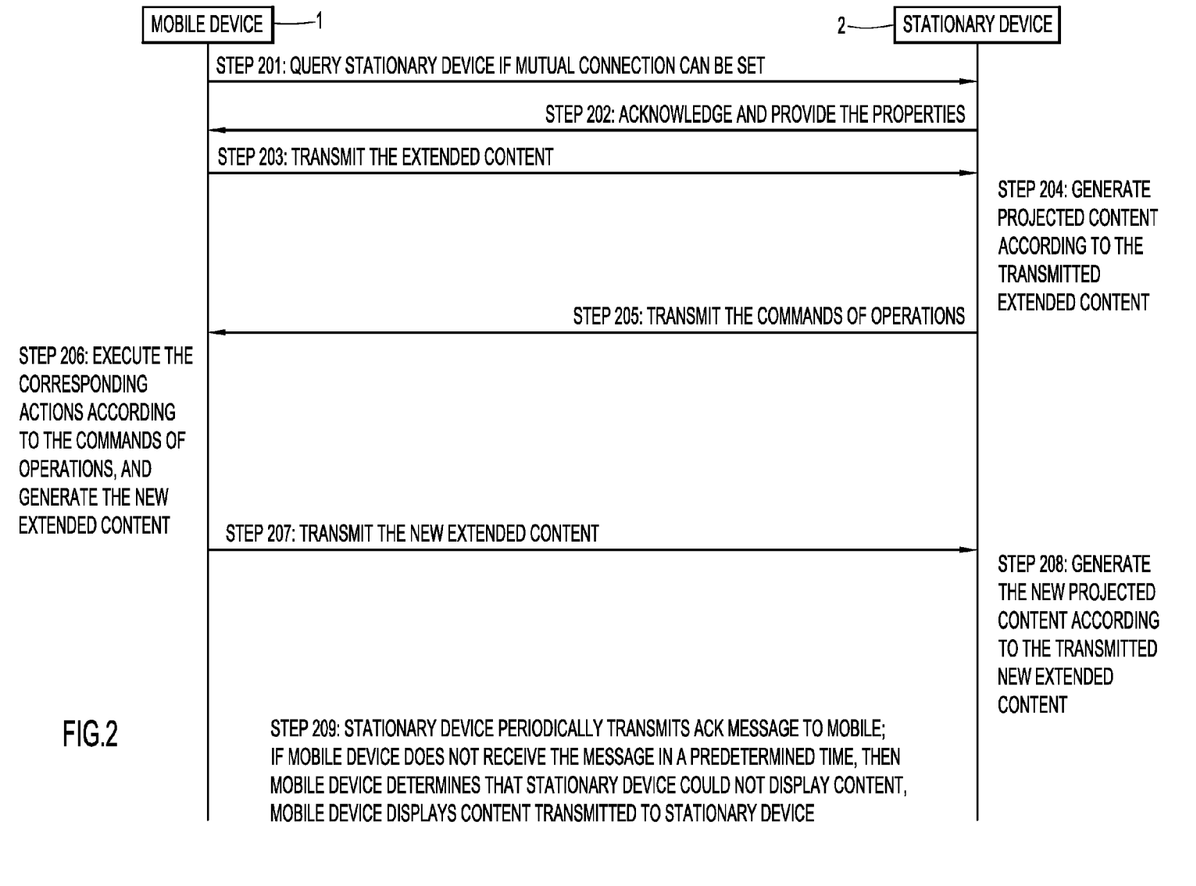
FIG. 2 is a ladder diagram illustrating interaction between a mobile device and stationary device in accordance with an embodiment of the present invention.

Reference is now made to FIG. 2, which is a ladder diagram illustrating the interaction between mobile device 1 and stationary device 2 in accordance with an embodiment of the present invention. The several steps and functions described below and depicted in FIG. 2 may be implemented by mobile device interactive remote window logic 15 and stationary device interactive window logic 25, as appropriate. At Step 201 mobile device 1 queries stationary device 2 to determine if a mutual connection can be set or established. That is, mobile device 1 is, e.g., configured to emit a query to any available Bluetooth-capable device such as a laptop computer that is close to mobile device 1.

Thus, if mobile device 1 and stationary device 2 are not yet recognized by one another, and thus not already paired, mobile device 1 and stationary device 2 proceed with a pairing procedure according to, e.g., the Bluetooth protocol. In Step 202 in FIG. 2, in response to the query by mobile device 1, stationary device 2 acknowledges and provides properties relevant to establishing the connection between mobile device 1 and stationary device 2.

Figure 3:
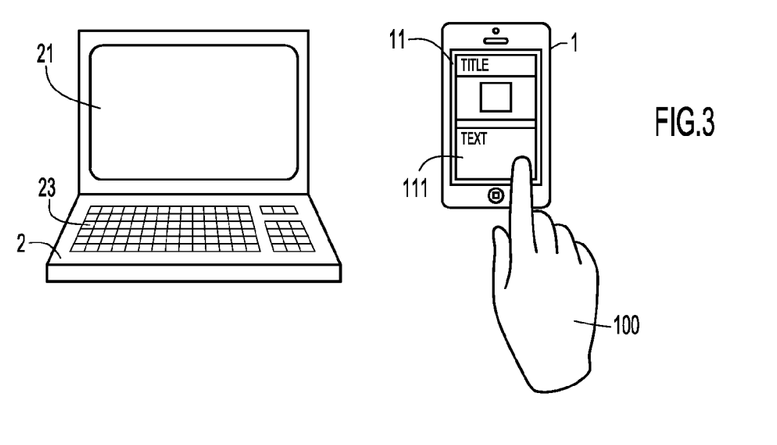
FIG. 3 illustrates an application window on a mobile device that can be transitioned to a stationary device in accordance with an embodiment of the present invention.
Figure 4:
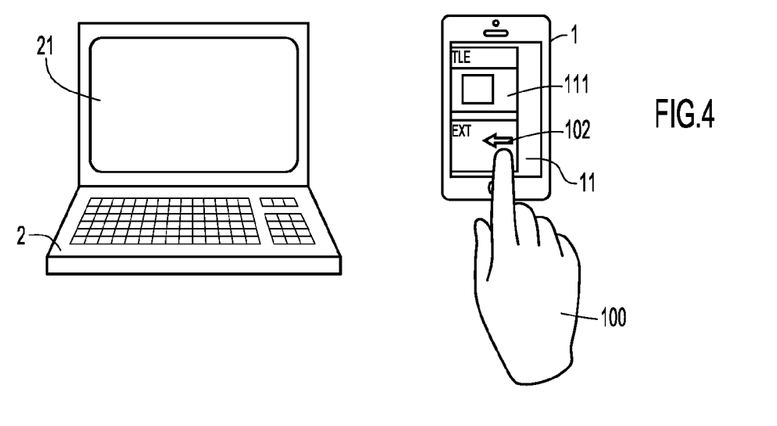
FIG. 4 illustrates a swiping operation that causes the application window on the mobile device to be transitioned to the stationary device in accordance with an embodiment of the present invention.

Once the connection between mobile device 1 and stationary device 2 is set or established, at Step 203 mobile device 1 transmits "extended content," e.g., content of an application window, to stationary device 2. Step 203 is best illustrated by FIGS. 3-5, which illustrate, respectively, an application window on mobile device 1 that can be transitioned to stationary device 2, a swiping operation that causes the application window on mobile device 1 to be transitioned to stationary device 2, and the result of the swiping operation whereby the application is displayed in a sub-window on stationary device 2.

More specifically, mobile device 1 includes display 11 which, in this case, is displaying an application window 111 previously launched by a user 100. Application window 111 may be, e.g., a browser window that is displaying content from a website obtained via the Internet and World Wide Web. As shown in FIG. 3, a user 100 can select, designate or appoint application window 111 to be shown in an application sub-window 211 of display 21 of stationary device 2. Once so designated, user 100 can effect a swiping operation 102 that causes application window 111 to be slid off of display 11 and appear in application sub-window 211 on stationary device 2. That is, extended content comprising the image of application window 111 is passed or transmitted to stationary device 2 such that a new application sub-window 211 is generated on display 21 and shows a mirrored version of application window 111. Those skilled in the art will appreciate that the operations of designating a given window and the swiping (or other touch) operation may be executed as a single operation. Further, it is noted that some mobile devices (smartphones) have the ability to instantiate two display buffers. With reference to FIG. 1, a first display buffer 18A may be used to display images on display 11 of mobile device 1, whereas a second display buffer 18B may be used to provide display images configured for application sub-window 211.

Figure 5:
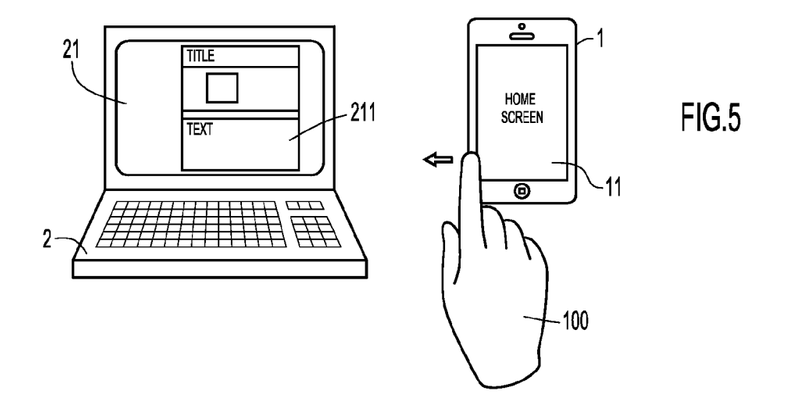
FIG. 5 illustrates the result of the swiping operation whereby the application window is now hosted by the stationary device in accordance with an embodiment of the present invention.

As is readily seen in FIG. 5, the browser application window is displayed simultaneously on mobile device 1 and stationary device 2. This state of the process is represented by Step 204 of FIG. 3, in which stationary device 2 generates projected (displayed) content according to the transmitted extended content. The projected content that is displayed on stationary device 2 may be generated on mobile device 1, stored in the second display buffer 18B, and then provided to stationary device 2 via communications link 110.

Figure 6:
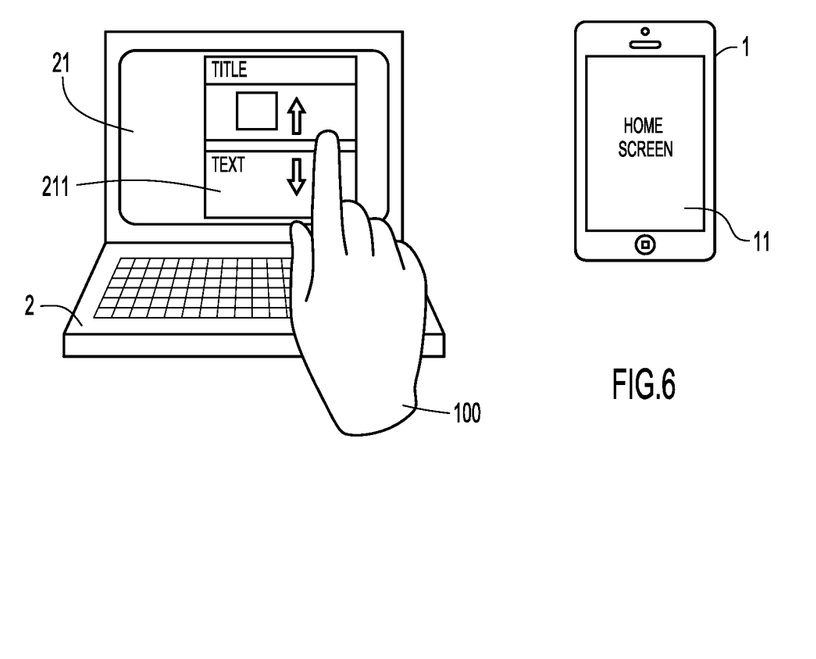
FIG. 6 illustrates user operation of the application window on the stationary device in accordance with an embodiment of the present invention.

At this time, when user 100 operates the application in application window 111 on mobile device 1, all operations and content are mirrored and displayed on the corresponding application sub-window 211 on stationary device 2. If user 100 uses input/output devices of stationary device 2, such as a mouse, touchpad, touch screen, or keyboard to perform operations in connection with application sub-window 211 (e.g. tap, input, and scroll), such operations are transcoded as, e.g., touch input commands, and sent back to mobile device 1 to perform corresponding operations on mobile device 1, e.g., within the browser application window 111. FIG. 6 illustrates an example scroll operation within the application sub-window 211 on stationary device 2 in accordance with an embodiment of the present invention.

The foregoing operations are represented in FIG. 2 by Steps 205-208. More specifically, at Step 205, stationary device 2 transmits commands of operations in connection with application sub-window 211 to mobile device 1. At Step 206, mobile device 1 executes the corresponding actions according to the commands of operations, and generates new extended content. At Step 207, the new extended content is transmitted to stationary device 2. At Step 208, stationary device 2 generates new projected content according to the transmitted new extended content.

Step 209 of FIG. 2 represents a "heartbeat" mechanism to ensure continual connectivity between mobile device 1 and stationary device 2. In accordance with Step 209, stationary device 2 periodically transmits an acknowledgement message to mobile device 1. If mobile device 1 does not receive the message in a predetermined amount of time, then mobile device 1 determines that stationary device 2 can no longer accurately display any changes in application window 111. However, any changes made to application sub-window 211 will have already been transmitted to mobile device 1, ensuring that application window 111 on mobile device 1 is up to date.

Figure 7:
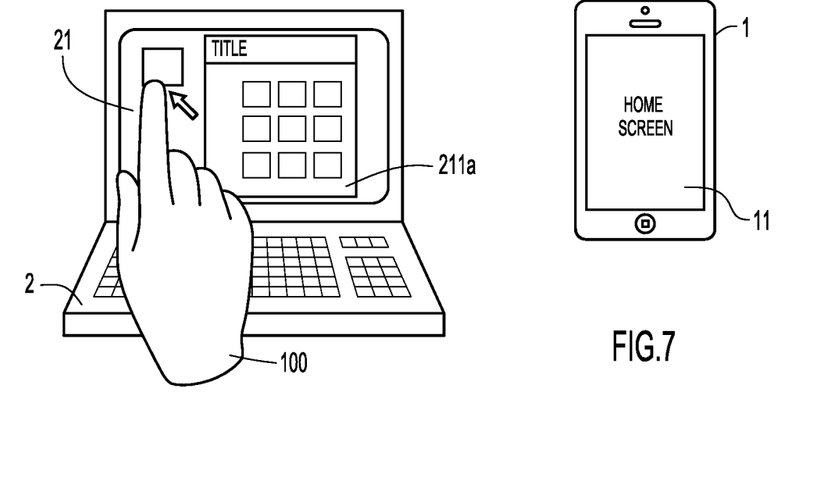
FIG. 7 illustrates a file exchange operation in accordance with an embodiment of the present invention.

FIG. 7 illustrates a file exchange operation in accordance with an embodiment of the present invention. In FIG. 7, application sub-window 211*a* is a window showing a plurality of icons representing files stored on mobile device 1. Recall that application sub-window 211, now 211*a* in this depiction, is a window that represents an application that is operating on mobile device 1 and is being mirrored to stationary device 2. In accordance with the instant file exchange operation of the present invention, user 100 can use a "drag & drop" operation to copy files within the application sub-window 211*a*, which, as noted, corresponds to an application running on mobile device 1, to folders or the desktop of the stationary device 2. Upon detecting the drag & drop operation (see, e.g., Step 205 of FIG. 2), mobile device 1 and stationary device 2 are configured to perform file transfer in the background (e.g., via the Bluetooth link) to achieve the desired files to be copied & pasted from memory 12 of mobile device 1 to memory 22 of stationary device 2. Likewise, user 100 can also drag & drop files within folders or on the desktop of stationary device 2 into application sub-window 211*a*, resulting in a copy & paste of a file or files from stationary device 2 to mobile device 1.

Figure 8:
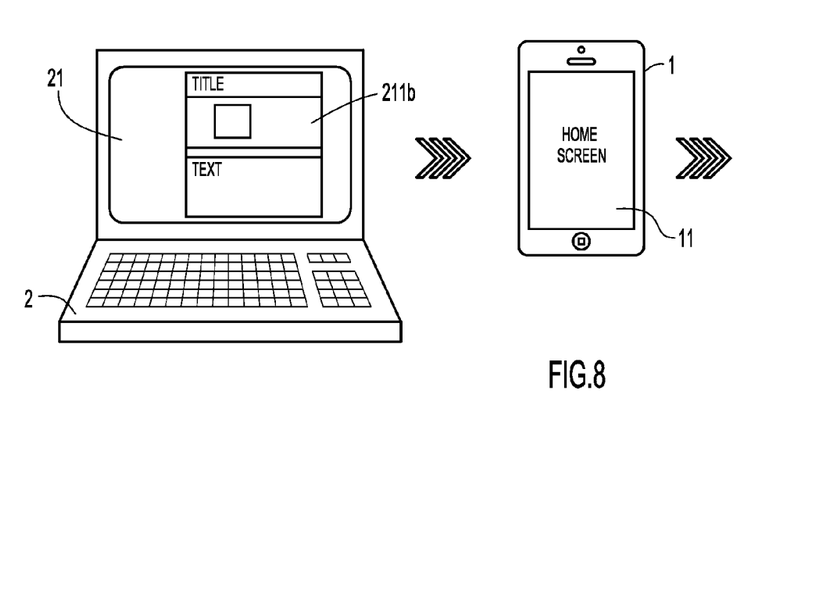
FIG. 8 illustrates the possibility that the mobile device moves away from the stationary device in accordance with an embodiment of the present invention.
Figure 9:
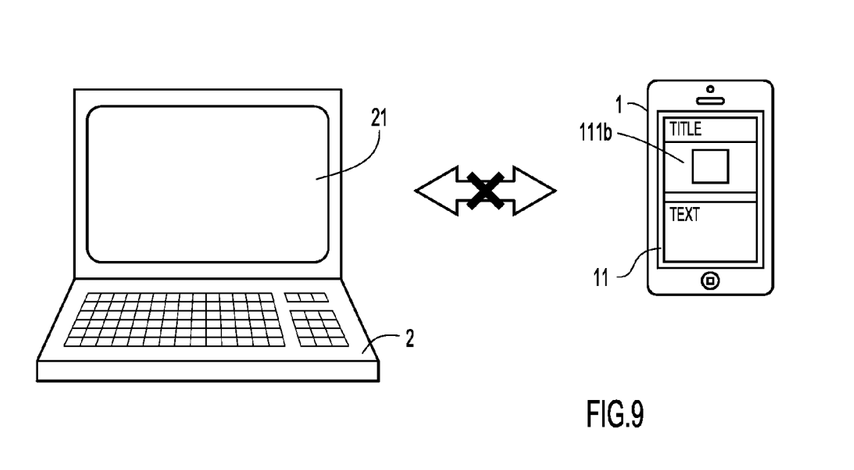
FIG. 9 illustrates loss of connectivity between the stationary device and the mobile device in accordance with an embodiment of the present invention.

FIG. 8 illustrates the possibility that mobile device 1 moves away from stationary device 2. It is also possible, of course, that stationary device 2 is moved from a location where mobile device 1 is present. Regardless of which device moves, at some point, communication link 110 is severed such that mobile device 1 and stationary device can no longer communicate with one another. FIG. 9 illustrates a final loss of connectivity between stationary device 2 and mobile device 1 in accordance with an embodiment of the present invention. When this finally occurs, application sub-window 211 on stationary device 2 is closed automatically. Notably, the underlying application on mobile device 1 is fully synced with application sub-window 211 since the computation in connection with the application has continually been performed by the mobile device 2 from beginning to end. As a result, user 100 can seamlessly transition to mobile device 1 to continue working with the application without interruption.

As noted previously, embodiments of the present invention are configured such that interactive remote windows application described herein can operate even when mobile device 1 and stationary device 2 operate in accordance with different operating systems. That is, the respective operating systems of mobile device 1 and stationary device 2 may be heterogeneous. As a result, users can, e.g., easily pair smartphones and laptop computers from different manufacturers. This provides significant convenience to users who maintain files and maintain and operate productivity software on a smartphone, but have periodic access to a larger laptop or desktop computer with more desirable input/output interfaces.

In sum, a method of operating, from a stationary device, an application that is running on a mobile device, is provided. The method includes communicatively pairing a mobile device with a stationary device, causing the stationary device to open a window that will display content of an application running on the mobile device, sending the content from the application running on the mobile device to the stationary device, receiving operation commands for the application running on the mobile device from the stationary device, the operation commands being operable to cause actions to be executed by the application running on the mobile device, and sending new content from the application running on the mobile device to the stationary device, the new content resulting from the operation commands having been executed by the application running on the mobile device. In a specific implementation, the mobile device has a first operating system and the stationary device has a second operating system, and the first operating system and the second operating system are different from one another.

The method further includes communicatively pairing the mobile device with the stationary device by pairing the mobile device with the stationary device using a wireless protocol. The wireless protocol may be, e.g., Bluetooth.

The method also includes causing the application running on the mobile device to be opened in a window of the stationary device in response to a trigger by a touch input on the mobile device.

The method further includes periodically receiving an acknowledgement message from the stationary device.

The method still further includes determining that the stationary device can no longer communicate with the mobile device when the acknowledgement message from the stationary device is not received after predetermined period of time and ceasing to send any additional content to the stationary device.

The method also includes maintaining a first display buffer and a second display buffer in memory of the mobile device, the first display buffer being used to provide display data to a display of the mobile device, and the second display buffer being used to supply the content from the application running on the mobile device to the window opened on the stationary device.

The method also provides for sending a copy of a file from the mobile device to the stationary device responsive to detecting an input operation on the stationary device indicating a desire to copy the file onto the stationary device.

The method also includes receiving a copy of a file from the stationary device responsive to detecting an input operation on the stationary device indicating a desire to copy the file onto the mobile device.

The above description is intended by way of example only.

What is claimed is:

1. A method of operating, from a stationary device, an application that is running on a mobile device, the method comprising:
   communicatively pairing a mobile device with a stationary device;
   causing the stationary device to open a window that will display content of an application running on the mobile device;
   sending the content from the application running on the mobile device to the stationary device;
   receiving operation commands for the application running on the mobile device from the stationary device, the operation commands being operable to cause actions to be executed by the application running on the mobile device;
   sending new content from the application running on the mobile device to the stationary device, the new content resulting from the operation commands having been executed by the application running on the mobile device;
   periodically receiving an acknowledgement message from the stationary device; and
   determining that the stationary device can no longer communicate with the mobile device when the acknowledgement message from the stationary device is not received after a predetermined period of time and ceasing to send any additional content to the stationary device,
   wherein the mobile device has a first operating system and the stationary device has a second operating system, and the first operating system and the second operating system are different from one another.

2. The method of claim 1, wherein communicatively pairing the mobile device with the stationary device comprises pairing the mobile device with the stationary device using a wireless protocol.

3. The method of claim 2, wherein the wireless protocol is Bluetooth.

4. The method of claim 1, wherein causing the application running on the mobile device to be opened in a window of the stationary device is triggered by a touch input on the mobile device.

5. The method of claim 1, further comprising maintaining a first display buffer and a second display buffer in memory of the mobile device, the first display buffer being used to provide display data to a display of the mobile device, and the second display buffer being used to supply the content from the application running on the mobile device to the window opened on the stationary device.

6. The method of claim 1, further comprising sending a copy of a file from the mobile device to the stationary device responsive to detecting an input operation on the stationary device indicating a desire to copy the file onto the stationary device.

7. The method of claim 1, further comprising receiving a copy of a file from the stationary device responsive to detecting an input operation on the stationary device indicating a desire to copy the file onto the mobile device.

8. A mobile device configured to operate, from a stationary device, an application that is running on the mobile device, the mobile device comprising:
   a processor;
   a communications module operable to establish a communication link between the mobile device with the stationary device; and
   a memory, operable to store logic instructions, which when executed by the processor
      cause the stationary device to open a window that will display content of an application running on the mobile device;
      send, via the communications link, the content from the application running on the mobile device to the stationary device;
      receive, via the communications link, operation commands for the application running on the mobile device from the stationary device, the operation commands being operable to cause actions to be executed by the application running on the mobile device; and
      send, via the communications link, new content from the application running on the mobile device to the stationary device, the new content resulting from the operation commands having been executed by the application running on the mobile device;

periodically monitor for an acknowledgement message from the stationary device; and determine that the stationary device can no longer communicate with the mobile device when the acknowledgement message from the stationary device is not received after a predetermined period of time and causes the mobile device to cease sending any additional content to the stationary device, wherein the mobile device has a first operating system and the stationary device has a second operating system, and the first operating system and the second operating system are different from one another.

9. The mobile device of claim 8, wherein the communication link between the mobile device with the stationary device comprises is in accordance with a wireless protocol.

10. The mobile device of claim 9, wherein the wireless protocol is Bluetooth.

11. The mobile device of claim 8, wherein the logic instructions, when executed by the processor, cause the application running on the mobile device to be opened in a window of the stationary device in response to a touch input on the mobile device.

12. The mobile device of claim 8, wherein the logic instructions, when executed by the processor, cause the mobile device to maintain a first display buffer and a second display buffer in memory of the mobile device, the first display buffer being used to provide display data to a display of the mobile device, and the second display buffer being used to supply the content from the application running on the mobile device to the window opened on the stationary device.

13. The mobile device of claim 8, wherein the logic instructions, when executed by the processor, cause the mobile device to send a copy of a file from the mobile device to the stationary device responsive to detecting an input operation on the stationary device indicating a desire to copy the file onto the stationary device.

14. The mobile device of claim 8, wherein the logic instructions, when executed by the processor, cause the mobile device to receive a copy of a file from the stationary device responsive to detecting an input operation on the stationary device indicating a desire to copy the file onto the mobile device.

* * * * *